US012776542B2

(12) United States Patent
Pickhardt et al.

(10) Patent No.: US 12,776,542 B2
(45) Date of Patent: Oct. 27, 2026

(54) CORDLESS DEVICE AND SYSTEM

(71) Applicant: Andreas Stihl AG & Co. KG, Waiblingen (DE)

(72) Inventors: Moritz Pickhardt, Stuttgart (DE); Daniel Wagner, Winterbach (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 818 days.

(21) Appl. No.: 17/706,878

(22) Filed: Mar. 29, 2022

(65) Prior Publication Data

US 2022/0320667 A1 Oct. 6, 2022

(30) Foreign Application Priority Data

Mar. 30, 2021 (EP) .................................... 21166090

(51) Int. Cl.

*H01M 50/244* (2021.01)
*H01M 50/247* (2021.01)
*H01M 50/264* (2021.01)

(52) U.S. Cl.

CPC ....... *H01M 50/244* (2021.01); *H01M 50/247* (2021.01); *H01M 50/264* (2021.01)

(58) Field of Classification Search

CPC . H01M 50/244; H01M 50/247; H01M 50/264
See application file for complete search history.

(56) References Cited

U.S. PATENT DOCUMENTS

| | | | |
|---|---|---|---|
| 8,389,143 B2 | 3/2013 | Rosskamp et al. |
| 8,869,912 B2 | 10/2014 | Rosskamp et al. |
| 2010/0221594 A1 | 9/2010 | Rosskamp et al. |
| 2012/0067608 A1 | 3/2012 | Heinzelmann et al. |

(Continued)

FOREIGN PATENT DOCUMENTS

| | | |
|---|---|---|
| CN | 105935016 A | 9/2016 |
| CN | 205791671 U | 12/2016 |

(Continued)

OTHER PUBLICATIONS

German-language European Search Report issued in European Application No. 21166090.7 dated Sep. 23, 2022 with partial English translation (eight (8) pages).

(Continued)

*Primary Examiner* — Stewart A Fraser
*Assistant Examiner* — Patrick Marshall Greene
(74) *Attorney, Agent, or Firm* — Crowell & Moring LLP

(57) ABSTRACT

A cordless device includes a battery bay, a guiding web of a first type and a guiding web of a second type, different than the guiding web of the first type. The battery bay is designed for the exchangeable reception of a battery pack. The guiding web of the first type is designed for touching the battery pack in at least one guiding groove of the battery pack on at least one circumferential side of the battery pack for the guided positioning of the battery pack in a first direction in the battery bay. The guiding web of the second type is designed for touching the battery pack on at least one circumferential surface of the battery pack on at least the same circumferential side of the battery pack for the guided positioning of the battery pack in a second direction, different from the first direction, in the battery bay.

17 Claims, 6 Drawing Sheets

(56) References Cited

U.S. PATENT DOCUMENTS

| | | | | |
|---|---|---|---|---|
| 2016/0190524 A1* | 6/2016 | Hara | H01M 50/103 | |
| | | | 429/178 | |
| 2020/0358070 A1* | 11/2020 | Kolb | H01M 50/578 | |
| 2021/0359461 A1* | 11/2021 | Masatoshi | H01R 13/533 | |
| 2022/0271378 A1* | 8/2022 | Murakami | H01M 50/213 | |

FOREIGN PATENT DOCUMENTS

| | | | |
|---|---|---|---|
| CN | 206461012 | U | 9/2017 |
| DE | 10 2020 216 399 | A1 | 6/2022 |
| EP | 2 223 779 | A2 | 9/2010 |
| EP | 2 431 134 | B1 | 11/2015 |
| EP | 2 223 779 | B1 | 1/2016 |
| EP | 3 753 679 | A1 | 12/2020 |
| JP | 2018-88854 | A | 6/2018 |
| WO | WO 2017/220009 | A1 | 12/2017 |

OTHER PUBLICATIONS

Chinese-language Office Action issued in Chinese Application No. 202210322534.0 dated Mar. 12, 2026 with English translation (16 pages).

Chinese-language Office Action issued in Chinese Application No. 202210322534.0 dated Jul. 18, 2026 with partial English translation (19 pages).

German-language Communication under Rule 71(3) EPC issued in European Application No. 21 166 090.7 dated Jul. 22, 2026 (7 pages).

* cited by examiner

CORDLESS DEVICE AND SYSTEM

CROSS REFERENCE TO RELATED APPLICATION

This application claims priority under 35 U.S.C. § 119 from European Patent Application No. 21166090.7, filed Mar. 30, 2021, the entire disclosure of which is herein expressly incorporated by reference.

BACKGROUND AND SUMMARY OF THE INVENTION

The invention relates to a cordless device and to a system comprising a, in particular such a, cordless device and/or a battery pack.

The invention addresses the problem of providing a cordless device and a system comprising a, in particular such a, cordless device and/or a battery pack which comprises or has respectively improved properties.

The invention solves the problem by providing a cordless device and systems in accordance with the independent claims. Advantageous developments and/or embodiments of the invention are described in the dependent claims.

The, in particular electrical, cordless device according the invention comprises or has, in particular at least, a battery bay, at least a guiding web of a first type and at least a guiding web of a second type, of a different type than the guiding web of the first type. The battery bay is designed or configured for exchangeably, in particular completely, receiving a battery pack. At least the guiding web of the first type is designed or configured for the, in particular direct, touching of the battery pack in at least one guiding groove of the battery pack on at least one circumferential side of the battery pack for the guided positioning, in particular fixing and/or centering, of the battery pack in, in particular only, one, in particular single, first direction in the battery bay. At least the guiding web of the second type is designed or configured for the, in particular direct, touching of the battery pack on at least one circumferential surface, in particular the circumferential surface, of the battery pack on at least the same circumferential side of the battery pack for the guided positioning, in particular fixing and/or centering, of the battery pack in, in particular only, one, in particular single, second direction, different from the first direction, in the battery bay.

This, in particular the sharing of the different functions of the guided positioning of the battery pack in the first direction and the guided positioning of the battery pack in the second direction between at least the guiding web of the first type and at least the guiding web of the second type, makes it possible to avoid a mechanical overdetermination. In addition or as an alternative, in particular consequently, this makes possible easy production of a tool for producing the cordless device, in particular the battery bay, at least the guiding web of the first type and/or at least the guiding web of the second type.

In particular, at least the guiding web of the first type need not or may not be designed for the guided positioning of the battery pack in the second direction. In addition or as an alternative, at least the guiding web of the second type need not or may not be designed for the guided positioning of the battery pack in the first direction. Also in addition or as an alternative, at least the guiding web of the second type need not or may not be designed for touching the battery pack in at least one, in particular further one, of the guiding grooves of the battery pack, in particular not for extending into at least one of the guiding grooves. Also in addition or as an alternative, at least the guiding web of the first type need not or may not be designed for touching the battery pack on at least one, in particular the, circumferential surface of the battery pack.

The circumferential surface may be planar.

The circumferential surface and the guiding groove may adjoin one another.

The term "depression" or the term "slot" may be used synonymously for the term "groove". In addition or as an alternative, the guiding groove may comprise or have a cross section with a half-oval shape.

At least the guiding groove of the first type and/or at least the guiding groove of the second type may comprise or have, in particular in each case, a cross section with a rectangular shape. In addition or as an alternative, at least the guiding groove of the first type and at least the guiding groove of the second type may in particular be arranged in a plane defined or spanned by the first direction and the second direction. Also in addition or as an alternative, at least the guiding groove of the first type and at least the guiding groove of the second type may run substantially or approximately, in particular exactly, parallel to one another. In particular, substantially parallel may mean a deviation of a maximum of 5° (degrees), in particular a maximum of 2°, in particular a maximum of 1°, from one another. Also in addition or as an alternative, the term "rib" may be used synonymously for the term "web".

At least the guiding web of the first type and/or at least the guiding web of the second type may be, in particular in each case, arranged in particular on at least one, in particular the same and/or inner, circumferential side of the battery bay. In addition or as an alternative, at least the guiding web of the first type and/or at least the guiding web of the second type may be, in particular in each case, arranged, in particular fastened, with respect to the battery bay, in particular on the battery bay, in particular a side wall of the battery bay.

The battery bay may be designed for the tool-free and/or non-destructive reception of the battery pack. In addition or as an alternative, the term "removable" or the term "interchangeable" may be used synonymously for the term "exchangeable". Also in addition or as an alternative, the battery bay may extend over, or in particular project beyond, the, in particular received, battery pack, in particular upwards. This may make it possible for the battery pack to be protected, in particular by the battery bay. Also in addition or as an alternative, the battery bay may be open, in particular upwards, for receiving the battery pack. Also in addition or as an alternative, the battery bay may be closed on its circumferential side or circumferentially and/or underneath.

The guiding groove may be open, in particular downwards, for the introduction of the guiding web of the first type. In addition or as an alternative, the circumferential side of the battery pack may be an outer circumferential side and/or of a housing, in particular an outer housing, of the battery pack.

In a development of the invention, at least the guiding web of the first type projects further forward along the second direction, in particular from the side wall of the battery bay, towards the battery pack than at least the guiding web of the second type, in particular on at least the same circumferential side. In addition or as an alternative, at least the guiding web of the first type is longer along the second direction than at least the guiding web of the second type. This makes possible the various functions or the guided positioning of the battery pack in the first direction by at least the guiding web of the first type and the guided positioning of the battery pack in the second direction by at least the guiding web of the second type.

In a development of the invention, the cordless device comprises or has at least a guiding web of a third type, of a different type than the guiding web of the first type and/or the guiding web of the second type. At least the guiding web of the third type is designed or configured for extending into at least one, in particular further one, of the guiding grooves of the battery pack on at least the same circumferential side of the battery pack, in particular for protecting the battery pack in the first direction and/or the second direction in the battery bay. In particular, at least the guiding web of the third type is narrower along the first direction that at least the guiding web of the first type. In addition or as an alternative, at least the guiding web of the third type is longer along the second direction than at least the guiding web of the first type. Also in addition or as an alternative, at least the guiding web of the third type projects further forward along the second direction, in particular from the side wall of the battery bay, towards the battery pack than at least the guiding web of the first type, in particular on at least the same circumferential side. This makes touching of the battery pack in at least the guiding groove by at least the guiding web of the third type only possible in particular when there is a high mechanical load and/or makes avoidance of touching of the battery pack in at least the guiding groove by at least the guiding web of the third type possible when there is a low or no mechanical load. In addition or as an alternative, in particular consequently, this makes possible avoidance of jamming, in particular jamming fast, of the battery pack, in particular in the battery bay, by at least the guiding web of the third type, in particular when there is a low or no mechanical load. In particular, at least the guiding web of the third type need not or may not be designed for touching the battery pack when there is a low or no mechanical load. In addition or as an alternative, at least the guiding web of the third type need not or may not be designed for touching the battery pack on at least one, in particular the, circumferential side of the battery pack. Also in addition or as an alternative, at least the guiding web of the third type may comprise or have a cross section with a rectangular shape. Also in addition or as an alternative, at least the guiding web of the third type may be, in particular arranged, in the plane defined by the first direction and the second direction. Also in addition or as an alternative, at least the guiding web of the first type and/or at least the guiding web of the second type and at least the guiding web of the third type may run substantially, in particular exactly, parallel to one another. Also in addition or as an alternative, at least the guiding web of the third type may be, in particular arranged, on at least the, in particular the same and/or inner, circumferential side of the battery bay. Also in addition or as an alternative, at least the guiding web of the third type may be arranged, in particular fastened, with respect to the battery bay, in particular on the battery bay, in particular the side wall of the battery bay.

In a development, in particular an embodiment, of the invention, the cordless device comprises two guiding webs of the first type, in particular two for each battery bay and/or precisely two. The guiding webs of the first type are designed for touching the battery pack in two guiding grooves of the battery pack on opposite circumferential sides of the battery pack. In addition or as an alternative, the cordless device comprises at least two, in particular precisely four, guiding webs of the second type, in particular for each battery bay. The guiding webs of the second type are designed for touching the battery pack on two circumferential surfaces of the battery pack on opposite circumferential sides of the battery pack and/or in particular are arranged offset along the first direction on at least the circumferential surface. Also in addition or as an alternative, the cordless device comprises two guiding webs of the third type, in particular two for each battery bay and/or precisely two. The guiding webs of the third type are designed for extending into two guiding grooves of the battery pack on opposite circumferential sides of the battery pack. This makes possible good positioning and/or good protecting of the battery pack, in particular in the battery bay.

In an embodiment of the invention, the guiding webs of the first type and/or the guiding webs of the second type and/or the guiding webs of the third type lie substantially or approximately, in particular exactly, opposite one another, in particular in each case, along the second direction. This makes possible particularly good positioning and/or particularly good protecting of the battery pack, in particular in the battery bay. In particular, substantially opposite along the second direction may mean at least partially opposite and/or at least less offset in relation to the same type than in relation to the different type from the second direction and/or along the first direction.

In a development, in particular an embodiment, of the invention, at least the guiding web of the first type and at least the guiding web of the second type, in particular and at least the guiding web of the third type, if present, are, and/or are arranged, offset along the first direction, in particular on at least the same circumferential side. In particular, guiding webs of the second type are in particular arranged along the first direction and at least the guiding web of the first type and/or at least the guiding web of the third type in between. This makes possible the arrangement of at least the guiding web of the first type and at least the guiding web of the second type, in particular and at least the guiding web of the third type, in the plane defined by the first direction and the second direction and/or, in particular consequently, good positioning and/or good protecting of the battery pack, in particular in the battery bay.

In a development, in particular an embodiment, of the invention, the battery bay is designed for receiving the battery pack along a third direction. In particular, at least the guiding web of the first type and at least the guiding web of the second type, in particular and at least the guiding web of the third type, if present, are in particular arranged in a, in particular the, plane orthogonal to the third direction. In addition or as an alternative, at least the guiding web of the first type and/or at least the guiding web of the second type and/or at least the guiding web of the third type, if present, runs/run, in particular in each case, substantially or approximately, in particular exactly, parallel to the third direction. Also in addition or as an alternative, the first direction is substantially or approximately, in particular exactly, orthogonal to the third direction and/or substantially or approximately, in particular exactly, parallel to the circumferential side, in particular the circumferential surface. Also in addition or as an alternative, the second direction is substantially or approximately, in particular exactly, orthogonal to the first direction and/or substantially or approximately, in particular exactly, orthogonal to the third direction and/or substantially or approximately, in particular exactly, orthogonal to the circumferential side, in particular the circumferential surface. In particular, substantially orthogonal may mean a deviation of a minimum of 85°, in particular a minimum of 88°, in particular a minimum of 89°, from one another. In addition or as an alternative, the third direction may be substantially, in particular exactly, parallel to the circumferential side, in particular the circumferential surface.

In a development, in particular an embodiment, of the invention, at least the guiding web of the first type and at least the guiding web of the second type, in particular and at least the guiding web of the third type, if present, are arranged at least, in particular only, in the region of a, in particular closed and/or inner and/or lower, receiving end, in particular at the receiving end, of the battery bay. In particular, the cordless device comprises or has at least one electrical device contact, in particular a device plug-in connector, for the, in particular direct, electrical contacting of at least one electrical pack contact, in particular a pack plug-in connector, of the battery pack. At least the device contact is in particular arranged in the region of the receiving end, in particular at the receiving end, in particular on an end side of the battery bay. This makes possible positioning and/or protecting of the battery pack at a particularly relevant location, in particular in the battery bay. In particular, the cordless device need not or may not comprise a further guiding web of a different type on at least the circumferential side of the battery pack for the guided positioning or protecting of the battery pack in the battery bay in the region of the receiving end. In addition or as an alternative, in the region of the receiving end may mean closer than another, in particular opposite and/or open and/or outer and/or upper, receiving end, in particular introducing or inserting end, of the battery bay. Also in addition or as an alternative, the, in particular inner and/or a lower, receiving end may be referred to as the bottom end. Also in addition or as an alternative, the term "bottom side" may be used synonymously for the term "end side". Also in addition or as an alternative, at least the device contact may be designed for the, in particular tool-free and/or non-destructive, releasable contacting of at least the pack contact.

In a development of the invention, the cordless device comprises or has at least one, in particular the, electrical device contact, in particular a device plug-in connector, for the electrical contacting of at least one, in particular the, electrical pack contact, in particular a pack plug-in connector, of the battery pack. At least the guiding web of the first type and at least the guiding web of the second type are designed or configured for the positioning during the contacting. This makes positioning of the battery pack possible in a particularly relevant receiving step, in particular in the battery bay. In particular, the cordless device need not or may not comprise a further guiding web of a different type on at least the circumferential side of the battery pack for the positioning of the battery pack in the battery bay during the contacting. Also in addition or as an alternative, at least the device contact may be designed for the, in particular tool-free and/or non-destructive, releasable contacting of at least the pack contact.

In a development, in particular an embodiment, of the invention, at least the guiding web of the first type and at least the guiding web of the second type, in particular and at least the guiding web of the third type, are designed as one piece or one part with one another, in particular in one component. At least the device contact, if present, is arranged, in particular fastened, on the component. This makes possible an exact arrangement at least of the guiding web of the first type and at least the guiding web of the second type, in particular and at least the guiding web of the third type and/or at least the device contact, in relation to one another. In particular, the battery bay, in particular the side wall, may be designed as one piece, at least partially with at least the guiding web of the first type and at least the guiding web of the second type, in particular and at least the guiding web of the third type, in particular in the component. In addition or as an alternative, the component may be a cast component, in particular an injection-moulded component. Also in addition or as an alternative, the component may be referred to as a bottom plate and/or contact plate.

In a development, in particular an embodiment, of the invention, at least the guiding web of the first type and/or at least the guiding web of the third type, if present, is/are designed or configured, in particular asymmetrically arranged, for avoiding, in particular preventing, misaligned reception of the battery pack in the battery bay. This makes possible avoidance, in particular prevention, of incorrect contacting.

In a development of the invention, the battery bay is substantially or approximately, in particular exactly, parallelepiped-shaped, in particular cuboid-shaped. In addition or as an alternative, the battery bay has or comprises a width, in particular in the first direction, of a minimum of 5 cm (centimetres) and/or a maximum of 20 cm, a length, in particular in the second direction, of a minimum of 2.5 cm and/or a maximum of 10 cm and/or a height, in particular in a, in particular the, third direction, of a minimum of 7.5 cm and/or a maximum of 30 cm. Also in addition or as an alternative, the cordless device is designed or configured for a maximum electrical power of a minimum of 1 kW (kilowatt), in particular a minimum of 2 kW, and/or a maximum of 10 kW, in particular a maximum of 5 kW, and/or a, in particular electrical, rated voltage of a minimum of 10 V (volts), in particular a minimum of 20 V, and/or a maximum of 100 V, in particular a maximum of 50 V. In particular, substantially parallelepiped-shaped, in particular cuboid-shaped, may mean a deviation of a maximum of 5°, in particular a maximum of 2°, in particular a maximum of 1°. In addition or as an alternative, substantially parallelepiped-shaped, in particular cuboid-shaped, may mean rounded edges and/or rounded corners. In addition or as an alternative, the term "depth" may be used synonymously for the term "length".

In a development of the invention, the cordless device is, in particular either, a, in particular hand-guided, in particular hand-carried, working tool for electrical drive, in particular with electrical drive power, by means of the battery pack or a charger for electrical charging, in particular with electrical charging power, of the battery pack. This makes the high mechanical load possible. In particular hand-guided, in particular hand-carried, working tool may mean that the working tool may comprise or have a mass of a maximum of 50 kg (kilograms), in particular a maximum of 20 kg, in particular a maximum of 10 kg. In addition or as an alternative, the working tool may be a garden, forestry, construction and/or ground working tool, in particular a saw, in particular a chainsaw, a pole-mounted pruner, a brush cutter, or a hedge trimmer, or a hedge cutter, a blower, or a leaf blower, or a lopper, an angle grinder, a sweeper, a sweeping roller, a sweeping brush, or a lawnmower, a scarifier, a grass trimmer or a high-pressure cleaner. Also in addition or as an alternative, the charger may be a multi- or multiple-charger. Also in addition or as an alternative, the battery bay may be a storage bay for storing the battery pack.

The system according to the invention comprises or has a, in particular the, cordless device as previously mentioned or described and the battery pack. In particular, from at least the guiding web of the first type to the received, in particular and positioned, battery pack, a distance along the first direction is less than a distance along the second direction. In addition or as an alternative, from at least the guiding web of the third type, if present, to the received, in particular and positioned, battery pack, a distance along the first direction is equal to a distance along the second direction, in particular when there is a low or no mechanical load. Also in addition or as an alternative, the battery pack may comprise a plurality of battery cells. In particular, the battery cells may each be individual rechargeable storage elements for electrical energy on an electrochemical basis. Also in addition or as an alternative, the battery cells may be lithium-ion battery cells. Also in addition or as an alternative, the battery cells may be identical, in particular of the same type and/or construction. Also in addition or as an alternative, a, particular respective, cell voltage, in particular cell rated voltage, of a, in particular respective, one of the battery cells may be a minimum of 2 V and/or a maximum of 4 V, in particular 3.6 V. Also in addition or as an alternative, the battery cells may be round cells, prismatic cells or pouch cells. Also in addition or as an alternative, the battery pack, in particular its housing, may be substantially or approximately, in particular exactly, parallelepiped-shaped, in particular cuboid-shaped. Also in addition or as an alternative, the battery pack, in particular its housing, may comprise or have a width, in particular in the first direction, of a minimum of 5 cm and/or a maximum of 20 cm, a length, in particular in the second direction, of a minimum of 2.5 cm and/or a maximum of 10 cm and/or a height, in particular in a, in particular the, third direction, of a minimum of 7.5 cm and/or a maximum of 30 cm. Also in addition or as an alternative, the battery pack may be designed or configured for a maximum electrical power of a minimum of 1 kW, in particular a minimum of 2 kW, and/or a maximum of 10 kW, in particular a maximum of 5 kW, and/or a, in particular electrical, rated voltage of a minimum of 10 V, in particular a minimum of 20 V, and/or a maximum of 100 V, in particular a maximum of 50 V. Also in addition or as an alternative, the battery pack may comprise or have a maximum, in particular electrical, energy content of a minimum of 100 Wh (Watt hours), in particular a minimum of 200 Wh, and/or a maximum of 4000 Wh, in particular a maximum of 2000 Wh, in particular a maximum of 1000 Wh, in particular a maximum of 500 Wh. Also in addition or as an alternative, the battery pack may comprise or have a mass of a minimum of 0.5 kg (kilograms in particular a minimum of 1 kg, and/or a maximum of 10 kg, in particular a maximum of 5 kg.

As an alternative, in particular to whatever has previously been mentioned or described, the battery pack may comprise at least the guiding web of the first type and at least the guiding web of the second type, in particular and at least the guiding web of the third type. The cordless device, in particular its battery bay, may comprise at least the guiding groove and at least the circumferential surface. In particular, in whatever has previously been mentioned or described, the terms "battery pack" and "cordless device" and/or the terms "guiding web" and "guiding groove", in particular and "circumferential surface", are interchangeable. In addition or as an alternative, at least the guiding web of the first type, and in particular at least the guiding web of the third type, may project further along the second direction towards the cordless device, in particular the battery bay, than at least the guiding web of the second type, in particular on at least the same circumferential side. In other words:

The system according to the invention comprises a, in particular the, battery pack and/or a, in particular the, cordless device.

The battery pack is designed for being exchangeably received by a, in particular the, battery bay of the cordless device. The battery pack comprises at least a, in particular the, guiding web of the first type on at least one, in particular the, circumferential side and at least a, in particular the, guiding web of the second type, of a different type than the guiding web of the first type, on at least the same circumferential side. At least the guiding web of the first type is designed for touching the cordless device in at least one, in particular the, guiding groove of the cordless device, in particular the battery bay, for the guided positioning of the battery pack in, in particular only, one, in particular the and/or a single, first direction in the battery bay. At least the guiding web of the second type is designed for touching the battery pack on at least one, in particular the, circumferential surface of the cordless device, in particular the battery bay, for the guided positioning of the battery pack in, in particular only, one, in particular the and/or a single, second direction, different from the first direction, in the battery bay.

In addition or as an alternative, the cordless device comprises the battery bay, at least the guiding groove and at least the circumferential surface. The battery bay is designed for exchangeably receiving the battery pack. The cordless device is designed for touching by at least the guiding web of the first type of the battery pack on at least the circumferential side of the battery pack in at least the guiding groove for the guided positioning of the battery pack in, in particular only, the, in particular single, first direction in the battery bay. The cordless device is designed for touching by at least the guiding web of the second type, of a different type than the guiding web of the first type, of the battery pack on at least the same circumferential side of the battery pack on at least the circumferential surface for the guided positioning of the battery pack in, in particular only, the, in particular single, second direction, different from the first direction, in the battery bay.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
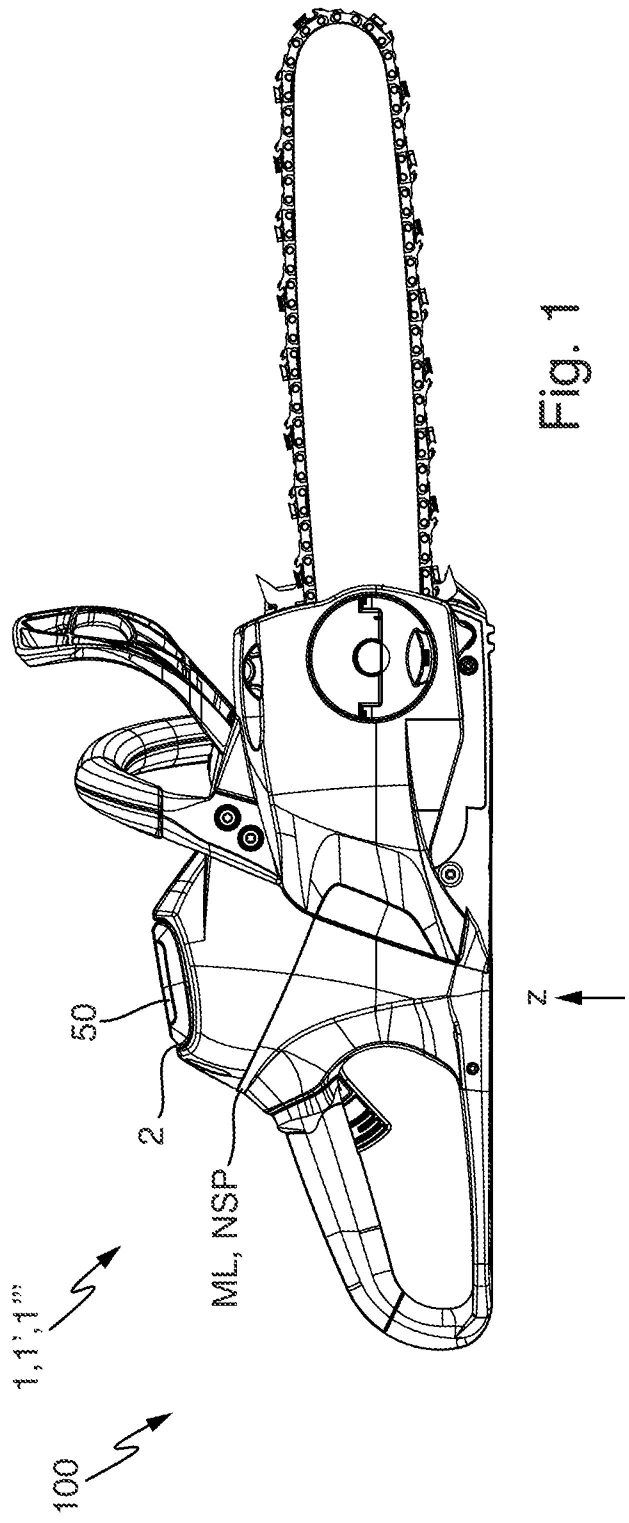
FIG. 1 schematically shows a side view of a system according to an embodiment of the invention comprising a cordless device according to an embodiment of the invention and a battery pack.

FIGS. 1 to 8 and 9 show, in particular in each case, a system 100, 100'. The system 100, 100' comprises, in particular at least, a cordless device 1, 1"" and a battery pack 50, 50' according to FIG. 9.

In the exemplary embodiment shown in FIGS. 1 to 8, the cordless device 1 comprises, in particular at least, a battery bay 2, at least a guiding web 3 of the first type and at least a guiding web 4 of the second type, of a different type than the guiding web 3 of the first type. The battery bay 2 is designed for exchangeably receiving, in particular receives, the battery pack 50. At least the guiding web 3 of the first type is designed for touching the battery pack 50 in at least one guiding groove 51 of the battery pack 50 on at least one circumferential side 50USya, 50USyb of the battery pack 50 for the guided positioning of the battery pack 50 in a first direction x in the battery bay 2, in particular touches and guides and positions thereby. At least the guiding web 4 of the second type is designed for touching the battery pack 50 on at least one circumferential surface 50UFya, 50UFyb of the battery pack 50 on at least the same circumferential side 50USya, 50USyb of the battery pack 50 for the guided positioning of the battery pack 50 in a second direction y, different from the first direction x, in the battery bay 2, in particular touches and guides and positions thereby.

Figure 2:
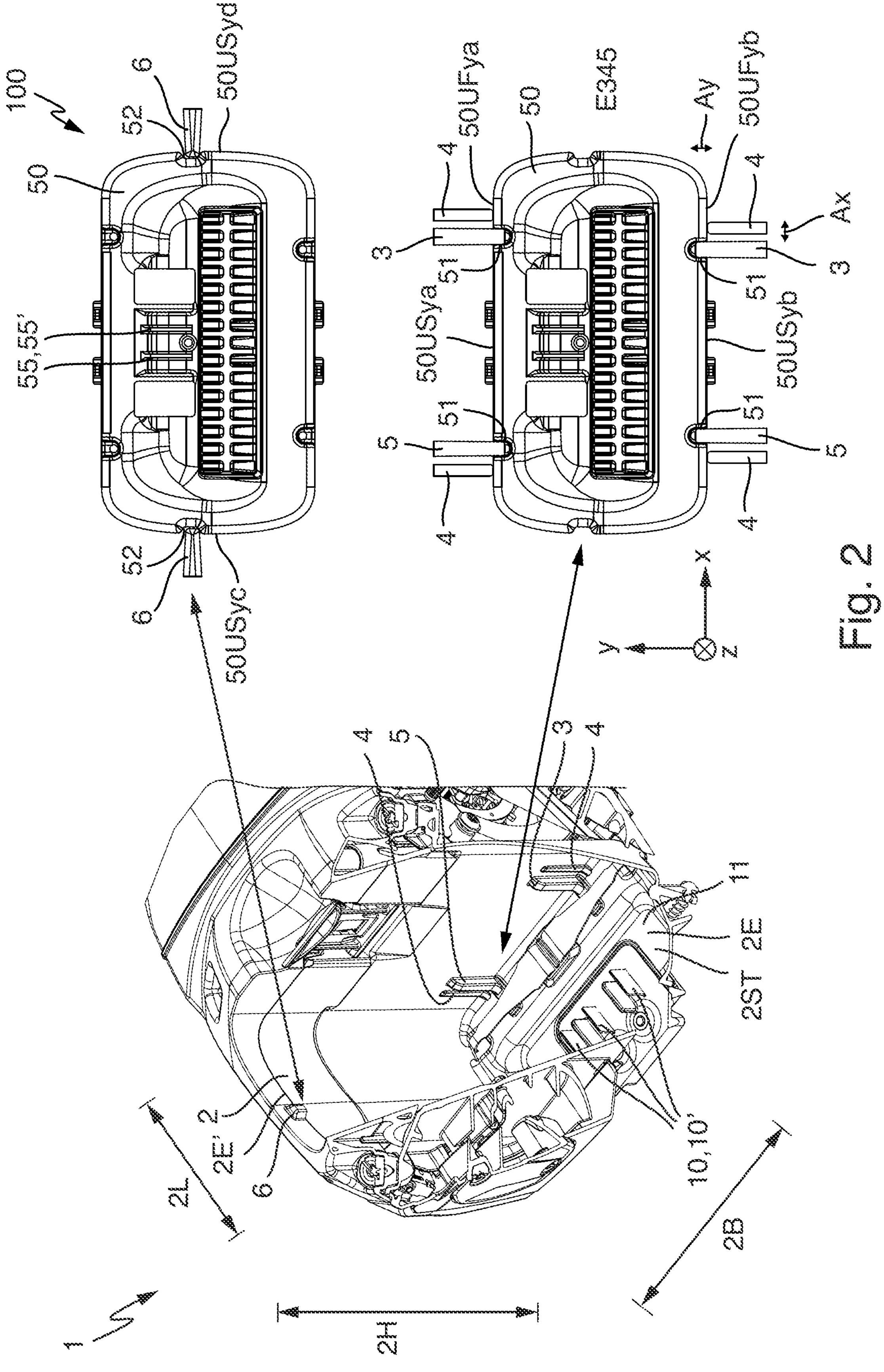
FIG. 2 schematically shows a sectioned perspective view of a battery bay, at least a guiding web of the first type, at least a guiding web of the second type, at least a guiding web of the third type and at least a guiding web of the fourth type of the cordless device of FIG. 1, a cross-sectional view at least of the guiding web of the fourth type and of the battery pack of FIG. 1 in the region of an introducing end of the battery bay and a cross-sectional view of at least the guiding web of the first type, at least the guiding web of the second type, at least the guiding web of the third type and the battery pack of FIG. 1 in the region of a receiving end of the battery bay.

In particular, from the guiding web 3 of the first type to the received battery pack 50, a distance Ax along the first direction x is less than a distance Ay along the second direction y, as shown in FIG. 2.

Figure 3:
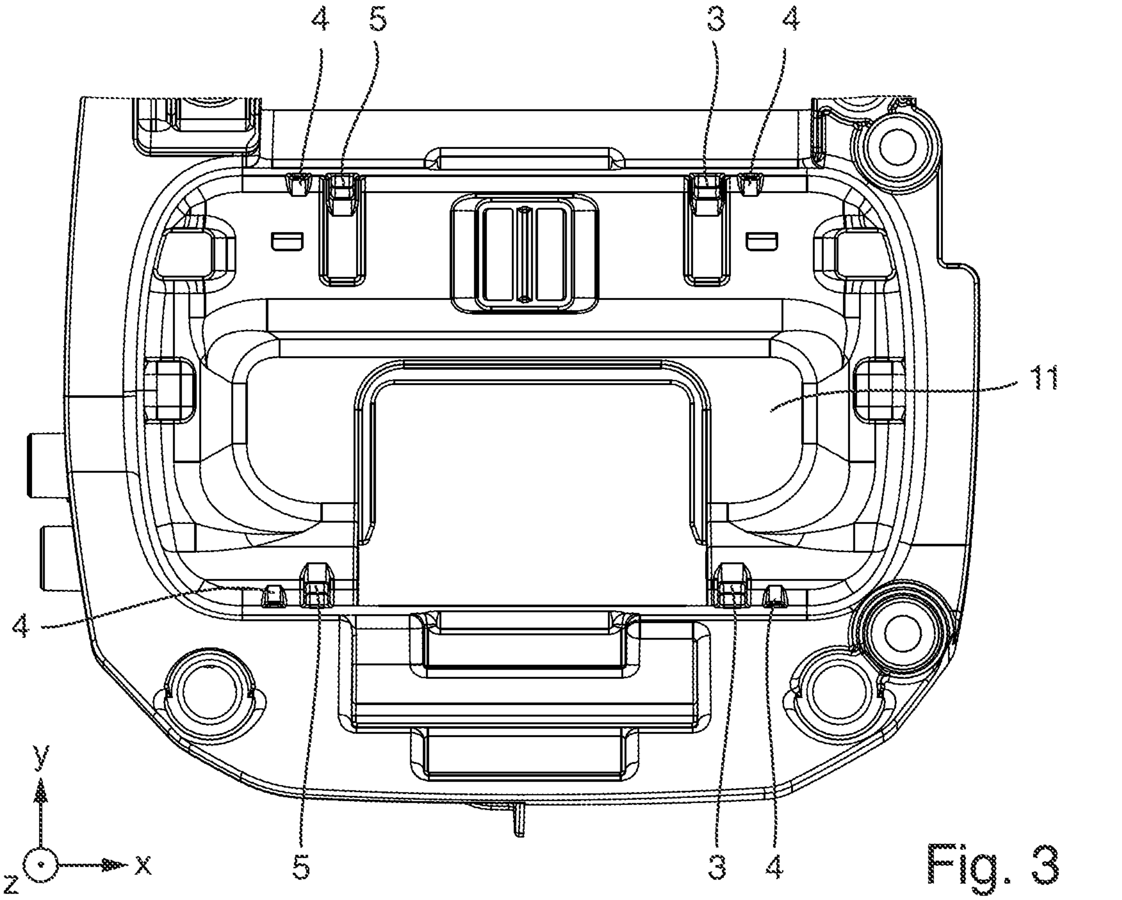
FIG. 3 schematically shows a plan view of the battery bay of FIG. 2.
Figure 4:
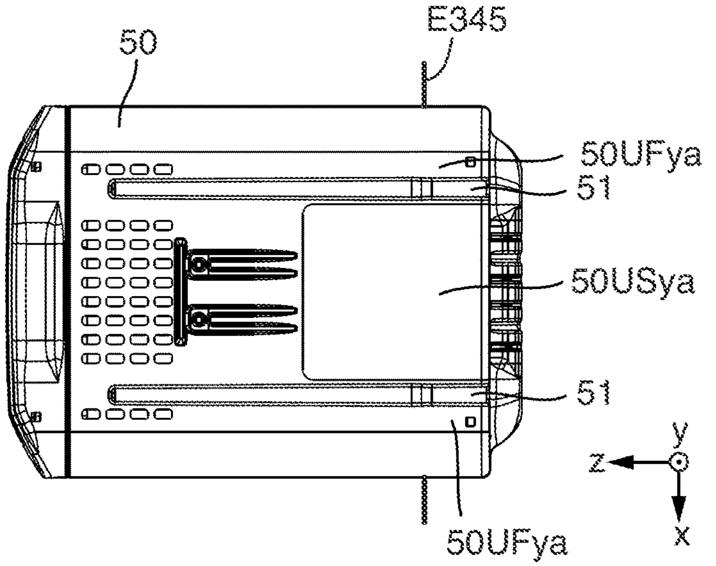
FIG. 4 schematically shows a view of the circumferential side of the battery pack of FIG. 1.
Figure 5:
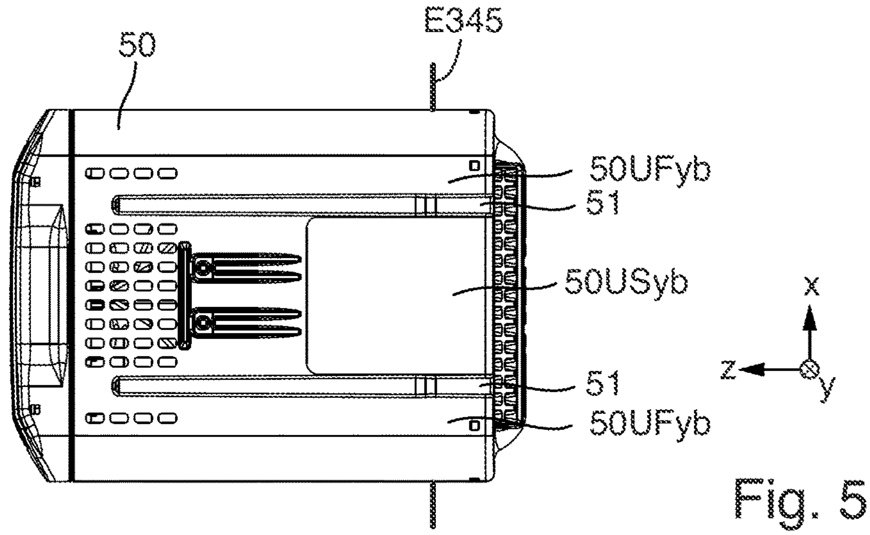
FIG. 5 schematically shows a view of an opposite circumferential side of the battery pack of FIG. 1.
Figure 6:
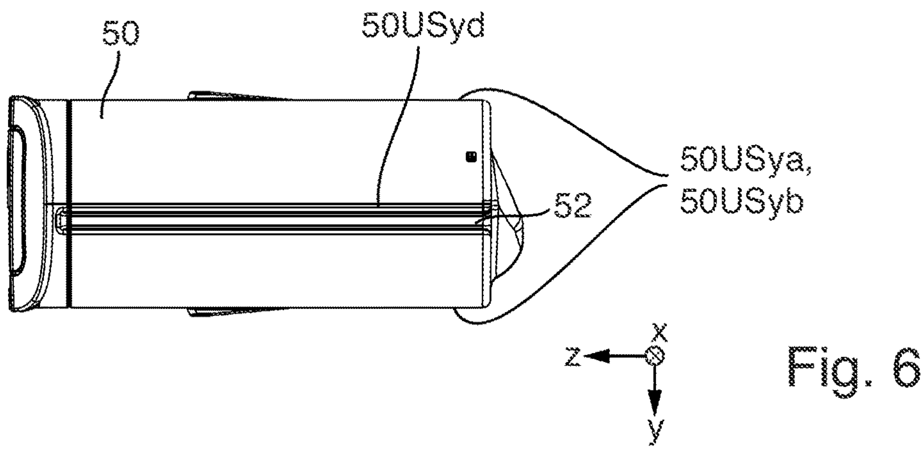
FIG. 6 schematically shows a view of a facing-away circumferential side of the battery pack of FIG. 1.

In FIGS. 1 to 3, the cordless device 1 is a, in particular hand-guided, in particular hand-carried, working tool 1' for electrical drive by means of the battery pack 50.

In the exemplary embodiment shown, the working tool 1' is a saw 1', in particular a chainsaw. In alternative exemplary embodiments, the working tool may be a pole-mounted pruner, a brush cutter, a hedge trimmer, a hedge cutter, a blower, a leaf blower, a lopper, an angle grinder, a sweeper, a sweeping roller, a sweeping brush, a lawnmower, a scarifier, a grass trimmer or a high-pressure cleaner.

Furthermore, in the exemplary embodiment shown, the working tool 1' comprises only a single battery bay 2. In alternative exemplary embodiments, the working tool may comprise at least two battery bays.

Figure 7:
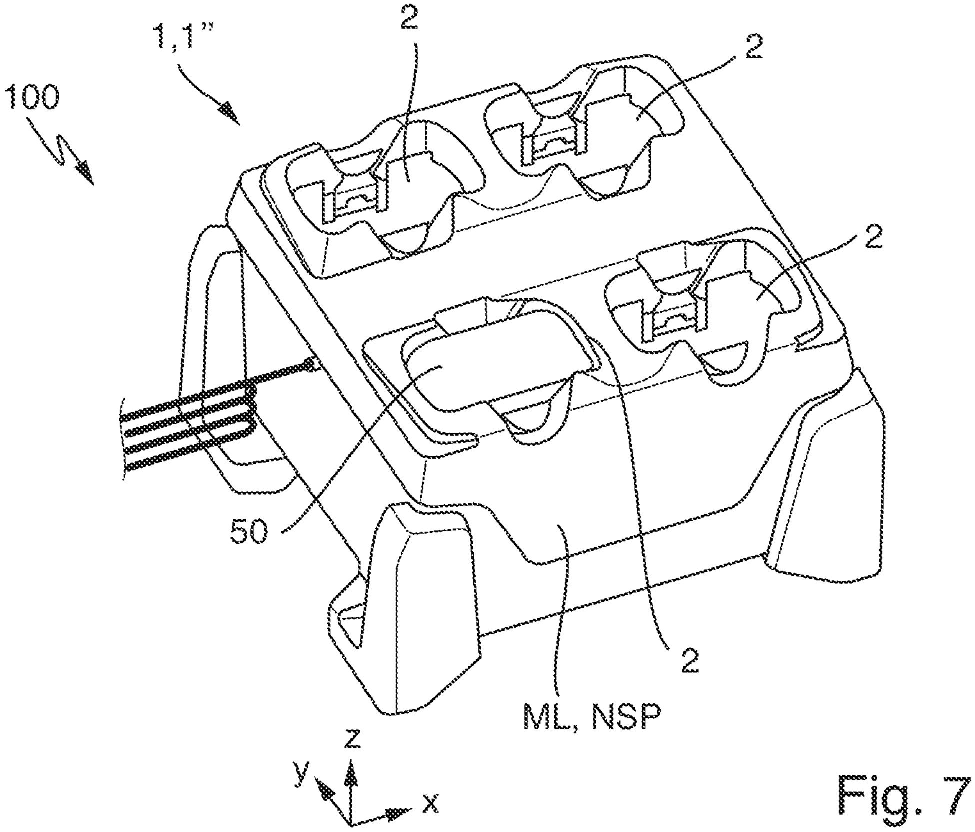
FIG. 7 schematically shows a perspective view of a system according to an embodiment of the invention comprising a further cordless device and the battery pack of FIG. 1.
Figure 8:
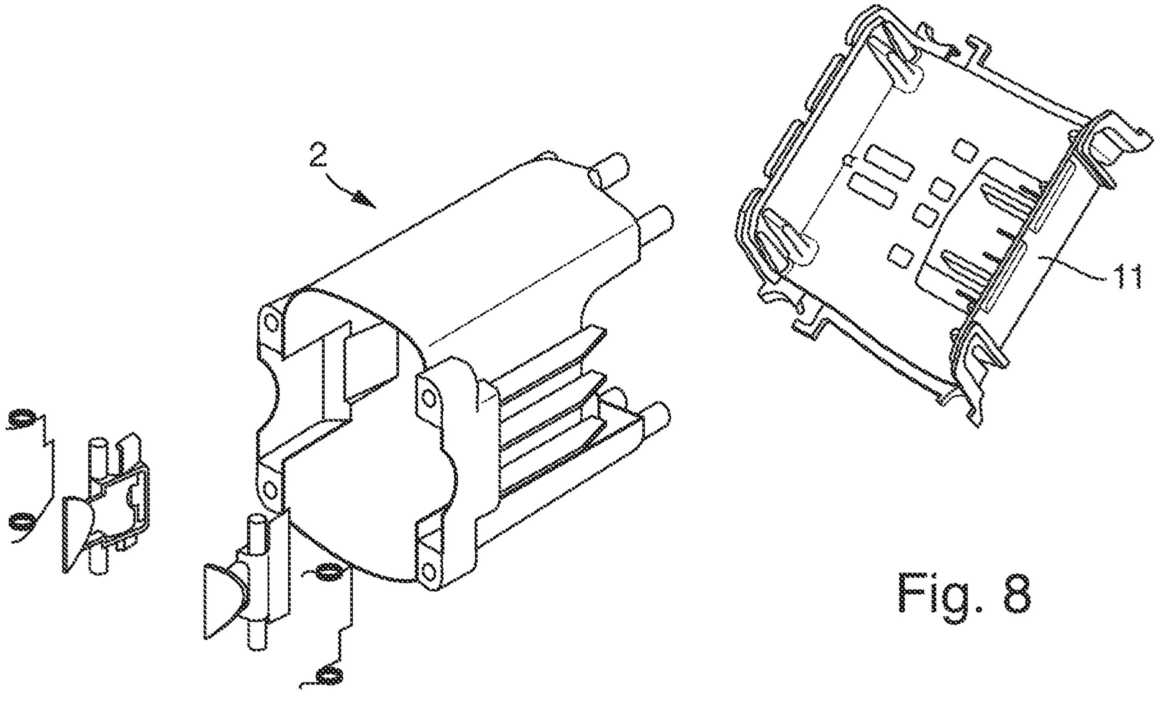
FIG. 8 schematically shows an exploded view of a battery bay of the cordless device of FIG. 7.

In FIGS. 7 and 8, the cordless device 1 is a charger 1" for the electrical charging of the battery pack 50.

In the exemplary embodiment shown, the charger 1" comprises four battery bays 2. In alternative exemplary embodiments, the charger may comprise only a single battery bay or at least two, in particular at least three, in particular at least five, battery bays.

In detail, at least the guiding web 3 of the first type projects further forward along the second direction y towards the battery pack 50 than at least the guiding web 4 of the second type, as shown in FIGS. 2 and 3.

In addition or as an alternative, at least the guiding web 3 of the first type is longer along the second direction y than at least the guiding web 4 of the second type.

Furthermore, the cordless device 1 comprises at least a guiding web 5 of a third type, of a different type than the guiding web 3 of the first type and/or the guiding web 4 of the second type. At least the guiding web 5 of the third type is designed for extending into at least one of the guiding grooves 51 of the battery pack 50 on at least the same circumferential side 50USya, 50USyb of the battery pack 50, in particular for protecting the battery pack 50 in the first direction x and/or the second direction y in the battery bay 50, in particular extends and secures thereby.

In particular, at least the guiding web 5 of the third type is narrower along the first direction x than at least the guiding web 3 of the first type.

In addition or as an alternative, at least the guiding web 5 of the third type is longer along the second direction y than at least the guiding web 3 of the first type.

Also in addition or as an alternative, at least the guiding web 5 of the third type projects further forward along the second direction y towards the battery pack 50 than at least the guiding web 3 of the first type.

Moreover, the cordless device 1 comprises two guiding webs 3 of the first type, in particular two for each battery bay 2 and/or precisely two. The guiding webs 3 of the first type are designed for touching, in particular touch, the battery pack 50 in two guiding grooves 51 of the battery pack 50 on opposite circumferential sides 50USya, 50USyb of the battery pack 50.

In addition or as an alternative, the cordless device 1 comprises at least two, in particular precisely four, guiding webs 4 of the second type, in particular for each battery bay 2. The guiding webs 4 of the second type are designed for touching, in particular touch, the battery pack 50 on two circumferential surfaces 50UFya, 50UFyb of the battery pack on opposite circumferential sides 50USya, 50USyb of the battery pack 50 and/or in particular are offset along the first direction x on at least the circumferential surface 50UFya, 50UFyb.

Also in addition or as an alternative, the cordless device 1 comprises two guiding webs 5 of the third type, in particular two for each battery bay 2 and/or precisely two. The guiding webs 5 of the third type are designed for extending, in particular extend, into two guiding grooves 51 of the battery pack 50 on opposite circumferential sides 50USya, 50USyb of the battery pack 50.

In detail, the guiding webs 3 of the first type and/or the guiding webs 4 of the second type and/or the guiding webs 5 of the third type lie substantially opposite one another along the second direction y.

Furthermore, at least the guiding web 3 of the first type and at least the guiding web 4 of the second type, in particular and at least the guiding web 5 of the third type, are offset along the first direction x.

In particular, guiding webs 4 of the second type are along the first direction and at least the guiding web 3 of the first type and/or at least the guiding web 5 of the third type are in between.

Furthermore, the battery bay 2 is designed for receiving, in particular receives, the battery pack 50 along a third direction z.

In particular, at least the guiding web 3 of the first type and at least the guiding web 4 of the second type, in particular and at least the guiding web 5 of the third type, are in a plane E345 orthogonal to the third direction z.

In addition or as an alternative, at least the guiding web 3 of the first type and/or at least the guiding web 4 of the second type and/or at least the guiding web 5 of the third type runs/run substantially parallel to the third direction z.

Also in addition or as an alternative, the first direction x is substantially orthogonal to the third direction z and/or substantially parallel to the circumferential side 50USya, 50USyb.

Also in addition or as an alternative, the second direction y is substantially orthogonal to the first direction x and/or substantially orthogonal to the third direction z and/or substantially orthogonal to the circumferential side 50USya, 50USyb.

Also in addition or as an alternative, the third direction z is substantially parallel to the circumferential side 50USya, 50USyb.

In the exemplary embodiments shown, the first direction x and/or the second direction y is/are substantially, in particular exactly, horizontal and/or the third direction z is substantially, in particular exactly, vertical.

Moreover, at least the guiding web 3 of the first type and at least the guiding web 4 of the second type, in particular and at least the guiding web 5 of the third type, are at least, in particular only, in the region of a, in particular lower, receiving end 2E of the battery bay 2.

Furthermore, the cordless device 1 comprises at least one electrical device contact 10, in particular a device plug-in connector 10', for the electrical contacting of, in particular it contacts, at least one electrical pack contact 55, in particular a pack plug-in connector 55', of the battery pack 50.

In addition, at least the device contact 10 is, in particular only, in the region of the receiving end 2E, in particular on an end side 2ST of the battery bay 2.

Also in addition or as an alternative, at least the guiding web 3 of the first type and at least the guiding web 4 of the second type are designed for positioning, in particular position, during the contacting.

Furthermore, at least the guiding web 3 of the first type and at least the guiding web 4 of the second type, in particular and at least the guiding web 5 of the third type and/or the battery bay 2 are designed at least, in particular only, partially as one piece with one another, in particular in one component 11. At least the device contact 11 is arranged on the component 11.

In particular, at least the device contact 11 is arranged in a movably mounted, in particular rubber-mounted, or floating manner, in particular on the component 11. This makes it possible to compensate for tolerances when receiving or inserting, in particular contacting, the battery pack 50.

In addition or as an alternative, at least the device contact 11 is or has been supplied with a ready-assembled cable harness and is arranged or mounted on the component 11. This makes simple or easy assemblability and/or simple or easy serviceability possible.

Also, at least the guiding web 3 of the first type and/or at least the guiding web 5 of the third type is/are designed, in particular asymmetrically arranged, for avoiding, in particular preventing, misaligned reception of the battery pack 50 in the battery bay 2.

In the exemplary embodiment shown in FIGS. 1 to 8, the cordless device 1 comprises at least a guiding web 6 of a fourth type, of a type different from the guiding web 3 of the first type and/or the guiding web 4 of the second type and/or the guiding web 5 of the third type, in particular precisely two guiding webs 6 of the fourth type for each battery bay 2. At least the guiding web 6 of the fourth type is designed for touching the battery pack 50 in at least one, other, guiding groove 52, in particular precisely two guiding grooves 52, of the battery pack 50 on at least one circumferential side 50USyc, 50USyd, facing away from the circumferential side 50USya, 50USyb, in particular opposite circumferential sides 50USyc, 50USyd, of the battery pack 50 for the guided positioning of the battery pack 50 in the first direction x and/or the second direction y in the battery bay 2, in particular touches and guides and positions thereby.

In particular, the guiding webs 6 of the fourth type lie substantially, in particular exactly, opposite one another along the first direction x.

In addition or as an alternative, at least the guiding web 6 of the fourth type runs substantially, in particular exactly, parallel to the third direction z.

Also in addition or as an alternative, at least the guiding web 6 of the fourth type is, in particular only, in the region of a, in particular upper, introducing end 2E' of the battery bay 2.

Also in addition or as an alternative, at least the guiding web 6 of the fourth type and the battery bay 2 are designed, in particular only, partially as one piece with one another, in particular in one, in particular other, component 11'.

In other words: the battery bay 2 is of two pieces or parts.

Also in addition or as an alternative, at least the guiding web 6 of the fourth type is designed, in particular asymmetrically arranged, for avoiding, in particular preventing, misaligned reception, in particular introduction, of the battery pack 50 in the battery bay 2.

Also in addition or as an alternative, at least the guiding web 3 of the first type and/or at least the guiding web 4 of the second type and/or at least the guiding web 5 of the third type and/or at least the guiding web 6 of the fourth type comprise(s) a sliding bevel, in particular in each case and/or in particular along the third direction z, towards the introduction end 2E' of the battery bay 2 or upwards.

Otherwise, the battery pack 50, in particular guided by the battery bay 2, slides until it comes up against or meets, in particular downwardly, at least the guiding web 3 of the first type and at least the guiding web 4 of the second type.

Moreover, arresting or fixing of the battery pack 50 in the battery bay 2 takes place by way of at least one step comprising a ramp and a notch. By at least one locking lever, in particular a maximum of two locking levers, the battery pack 50 is or has been held in the cordless device 1, in particular the battery bay 2.

Furthermore, a stop takes place in the third direction z by way of a circumferential surface, by which the battery pack 50 comes into touch with the end side 2ST of the battery bay 2. In particular, at least one ejecting or disengaging spring is in this case not yet fully compressed.

It should be noted that the stop in the third direction z of the battery pack 50 takes place, in particular only, when there is a high mechanical load. In the normal case or when there is a low or no mechanical load, at least the ejecting spring presses the battery pack 50 into a normal or operating position, which is adopted as a result of locking engagement with at least the locking lever.

For removing or taking out, in particular and gripping, the battery pack 50, there is at least one concave shell, in particular two shells. At least the locking lever presses into at least this shell when releasing the battery pack 50.

Furthermore, the battery bay 2 is substantially parallelepiped-shaped, in particular cuboid-shaped.

In addition or as an alternative, the battery bay 2 has a width 2B, in particular in the first direction x, of a minimum of 5 cm and/or a maximum of 20 cm, a length 2L, in particular in the second direction y, of a minimum of 2.5 cm and/or a maximum of 10 cm and/or a height 2H, in particular in the third direction z, of a minimum of 7.5 cm and/or a maximum of 30 cm.

In particular, at least the guiding web 3 of the first type and at least the guiding web 4 of the second type, in particular and at least the guiding web 5 of the third type, are, in particular arranged, on at least one wide side, in particular of the battery bay 2 and/or of the battery pack 50. In addition or as an alternative, at least the guiding web 6 of the fourth type is, in particular arranged, on at least one longitudinal side, in particular of the battery bay 2 and/or of the battery pack 50.

Also in addition or as an alternative, the cordless device 1 is designed for a maximum electrical power ML of a minimum of 1 kW, in particular a minimum of 2 kW, and/or a maximum of 10 kW, in particular a maximum of 5 kW, and/or a rated voltage NSP of a minimum of 10 V, in particular a minimum of 20 V, and/or a maximum of 100 V, in particular a maximum of 50 V.

Figure 9:
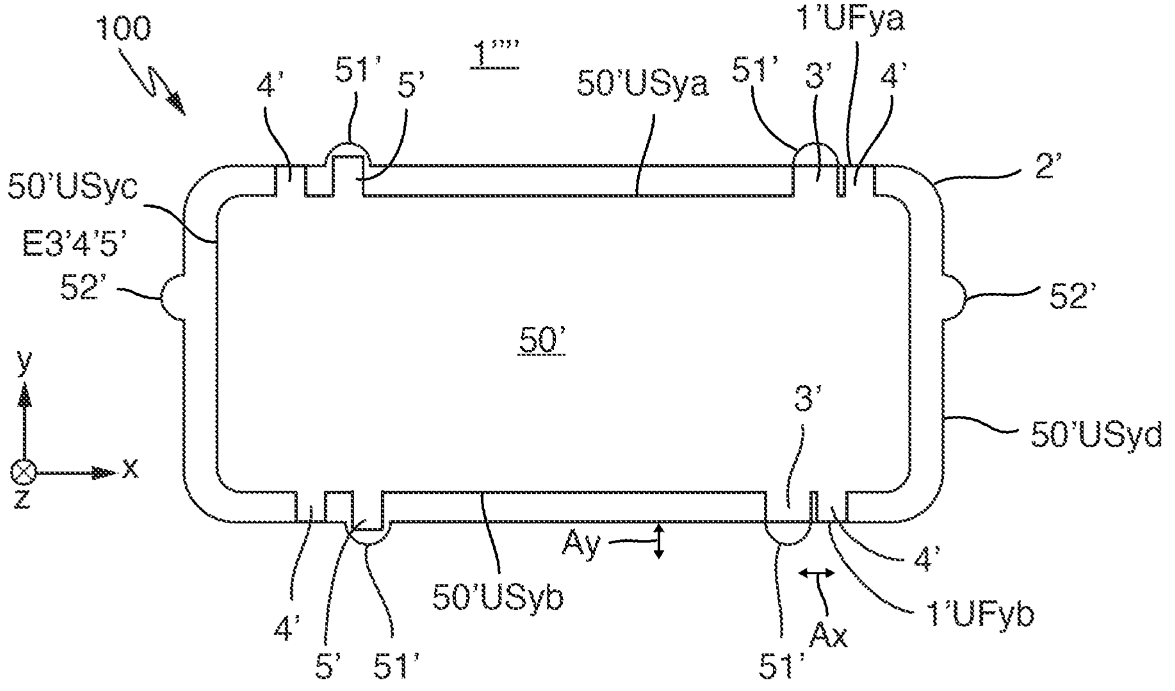
FIG. 9 schematically shows a cross-sectional view of a further system according to an embodiment of the invention comprising yet a further cordless device and a battery pack.

In the exemplary embodiment shown in FIG. 9, the battery pack 50' is designed for exchangeable reception, in particular is received, by a battery bay 2' of the cordless device 1''''. The battery pack 50' comprises at least a guiding web 3' of the first type on at least one circumferential side 50'USya, 50'USyb and at least a guiding web 4' of the second type, of a different type than the guiding web 3' of the first type, on at least the same circumferential side 50'USya, 50'USyb. At least the guiding web 3' of the first type is designed for touching the cordless device 1'''' in at least one guiding groove 51' of the cordless device 1'''' for the guided positioning of the battery pack 50' in a first direction x in the battery bay 2, in particular touches and is or has been guided and positioned thereby. At least the guiding web 4' of the second type is designed for touching the cordless device 1'''' on at least one circumferential surface 1'UFya, 1'UFyb of the cordless device 1'''' for the guided positioning of the battery pack 50' in a second direction y, different from the first direction x, in the battery bay 2, in particular touches and is or has been guided and positioned thereby.

In addition or as an alternative, the cordless device 1'''' comprises the battery bay 2', at least the guiding groove 51' and at least the circumferential surface 1'UFya, 1'UFyb. The battery bay 2' is designed for the exchangeable reception of, in particular receives, the battery pack 50'. The cordless device 1'''' is designed for touching by at least the guiding web 3' of the first type of the battery pack 50' on at least the circumferential side 50'USya, 50'USyb of the battery pack 50' in at least the guiding groove 51' for the guided positioning of the battery pack 50' in the first direction x in the battery bay 2', in particular is or has been touched and guides and positions thereby. The cordless device 1'''' is designed for touching by at least the guiding web 4' of the second type, of a different type than the guiding web 3' of the first type, of the battery pack 50' on at least the same circumferential side 50'USya, 50'USyb of the battery pack 50' on at least the circumferential surface 1'UFya, 1'UFyb for the guided positioning of the battery pack 50' in the second direction y, different from the first direction x, in the battery bay 2', in particular is or has been touched and guides and positions thereby.

Otherwise, whatever has previously been mentioned or described for the exemplary embodiment shown in FIGS. 1 to 8 applies to the exemplary embodiment shown in FIG. 9, in particular with the terms “battery pack” and “cordless device” and/or the terms “guiding web” and “guiding groove”, in particular and “circumferential surface”, being exchanged with one another.

As the exemplary embodiments shown and explained above make clear, the invention provides an advantageous cordless device and an advantageous system comprising a, in particular such a, cordless device and/or a battery pack which comprises or has respectively improved properties.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cordless device, comprising:

a battery bay, wherein the battery bay is configured for exchangeable reception of a battery pack;

at least a guiding web of a first type, wherein the guiding web of the first type is configured for touching the battery pack in at least one guiding groove of the battery pack on at least one circumferential side of the battery pack for guided positioning of the battery pack in a first direction in the battery bay; and at least two guiding webs of a second type, different than the guiding web of the first type, wherein the two guiding webs of the second type are configured for touching the battery pack on at least one circumferential surface of the battery pack on at least the same circumferential side of the battery pack for guided positioning of the battery pack in a second direction, different from the first direction, in the battery bay, wherein the two guiding webs of the second type are offset along the first direction on the at least one circumferential surface of the battery pack, wherein the guiding web of the first type and the two guiding webs of the second type are arranged on a same inner circumferential side of the battery bay, wherein the guiding web of the first type is located between the at least two guiding webs of the second type along the first direction, wherein, from at least the guiding web of the first type to a received battery pack, a distance along the first direction is less than a distance along the second direction, wherein at least the two guiding webs of the second type are configured so as not to touch and extend into any guiding grooves of the received battery pack, wherein the battery bay is configured for receiving the battery pack along a third direction, wherein the guiding web of the first type and the at least two guiding webs of the second type are in a plane orthogonal to the third direction, wherein the guiding web of the first type and the at least two guiding webs of the second type run substantially parallel to the third direction, wherein the first direction is substantially orthogonal to the third direction and substantially parallel to the circumferential side, and wherein the second direction is substantially orthogonal to the first direction, the third direction and the circumferential side.

2. The cordless device according to claim 1, wherein the guiding web of the first type projects further forward along the second direction towards the battery pack than the guiding web of the second type, and/or wherein the guiding web of the first type is longer along the second direction than the guiding web of the second type.

3. The cordless device according to claim 1, further comprising:

at least a guiding web of a third type, different than the guiding web of the first type and/or the two guiding webs of the second type, wherein the guiding web of the third type is configured for extending into at least one of the guiding grooves of the battery pack on the same circumferential side of the battery pack, wherein at least one of:

(i) the guiding web of the third type is narrower along the first direction than the guiding web of the first type, (ii) the guiding web of the third type is longer along the second direction than the guiding web of the first type, or (iii) the guiding web of the third type projects further forward along the second direction towards the battery pack than the guiding web of the first type.

4. The cordless device according to claim 3, wherein at least one of:

(i) the cordless device comprises two guiding webs of the first type, wherein the two guiding webs of the first type are configured for touching the battery pack in two guiding grooves of the battery pack on opposite circumferential sides of the battery pack, (ii) wherein a further two guiding webs of the second type are configured for touching the battery pack on an opposite circumferential side of the battery pack, or (iii) the cordless device comprises two guiding webs of the third type, wherein the two guiding webs of the third type are configured for extending into two guiding grooves of the battery pack on opposite circumferential sides of the battery pack.

5. The cordless device according to claim 4, wherein the guiding webs of the first type, the guiding webs of the second type, and/or the guiding webs of the third type lie substantially opposite one another along the second direction.

6. The cordless device according to claim 3, wherein the guiding web of the first type and the guiding web of the third type are offset along the first direction, and wherein at least one of: the guiding web of the first type or the guiding web of the third type, are located between the at least two guiding webs of the second type along the first direction.

7. The cordless device according to claim 3, wherein the guiding web of the first type, the at least two guiding webs of the second type, and the guiding web of the third type are in a plane orthogonal to the third direction, and/or wherein the guiding web of the first type, the at least two guiding webs of the second type and the guiding web of the third type run substantially parallel to the third direction.

8. The cordless device according to claim 3, wherein the guiding web of the first type, the guiding webs of the second type, and the guiding web of the third type, are in a region of a receiving end of the battery bay, wherein the cordless device comprises at least one electrical device contact for electrical contacting of at least one electrical pack contact of the battery pack, and wherein the one electrical device contact is in the region of the receiving end on an end side of the battery bay.

9. The cordless device according to claim 3, further comprising:

at least one electrical device contact for electrical contacting of at least one electrical pack contact of the battery pack, wherein the guiding web of the first type and the guiding webs of the second type are configured for positioning to carry out the contacting.

10. The cordless device according to claim 9, wherein the guiding web of the first type, the guiding webs of the second type and the guiding web of the third type, are configured as one piece with one another in one component, wherein the one electrical device contact is arranged on the component.

11. The cordless device according to claim 3, wherein the guiding web of the first type and/or the guiding web of the third type is/are configured asymmetrically arranged, for avoiding misaligned reception of the battery pack in the battery bay.

12. The cordless device according to claim 1, wherein at least one of:

(i) the battery bay is substantially parallelepiped-shaped, (ii) the battery bay comprises a width in the first direction of a minimum of 5 cm and/or a maximum of 20 cm, a length in the second direction of a minimum of 2.5 cm and/or a maximum of 10 cm, and/or a height in a third direction of a minimum of 7.5 cm and/or a maximum of 30 cm, or (iii) the cordless device is configured for a maximum electrical power of a minimum of 1 kW and/or a maximum of 10 kW and/or a rated voltage of a minimum of 10 V and/or a maximum of 100 V.

13. The cordless device according to claim 1, wherein the cordless device is: (i) a hand-guided working tool for electrical drive by way of the battery pack, or (ii) a charger for electrical charging of the battery pack.

14. A system, comprising:

a cordless device according to claim 1; and the battery pack.

15. A cordless device, comprising:

a battery bay, wherein the battery bay is configured for exchangeable reception of a battery pack;

at least a guiding web of a first type, wherein the guiding web of the first type is configured for touching the battery pack in at least one guiding groove of the battery pack on at least one circumferential side of the battery pack for guided positioning of the battery pack in a first direction in the battery bay;

at least a guiding web of a second type, different than the guiding web of the first type, wherein the guiding web of the second type is configured for touching the battery pack on at least one circumferential surface of the battery pack on at least the same circumferential side of the battery pack for guided positioning of the battery pack in a second direction, different from the first direction, in the battery bay, and at least a guiding web of a third type, different than the guiding web of the first type and the guiding web of the second type, wherein the guiding web of the third type is configured for extending into at least one of the guiding grooves of the battery pack on the same circumferential side of the battery pack, wherein the guiding web of the third type is longer along the second direction than the guiding web of the first type, wherein the guiding web of the first type is longer along the second direction than the guiding web of the second type, wherein the guiding web of the first type, the guiding web of the second type and the guiding web of the third type are arranged on a same inner circumferential side of the battery bay, wherein, from at least the guiding web of the first type to a received battery pack, a distance along the first direction is less than a distance along the second direction, wherein at least the guiding web of the second type is configured so as not to touch and extend into any guiding grooves of the received battery pack, wherein the guiding web of the third type is narrower along the first direction than the guiding web of the first type, wherein the battery bay is configured for receiving the battery pack along a third direction, wherein the guiding web of the first type, the guiding web of the second type, and the guiding web of the third type are in a plane orthogonal to the third direction, wherein the guiding web of the first type, the guiding web of the second type and the guiding web of the third type run substantially parallel to the third direction, wherein the first direction is substantially orthogonal to the third direction and substantially parallel to the circumferential side, and wherein the second direction is substantially orthogonal to the first direction, the third direction and the circumferential side.

16. The cordless device according to claim 1, wherein the guide web of the first type and the at least two guiding webs of the second type are fastened on a sidewall of the battery bay.

17. The cordless device according to claim 1, wherein the battery bay has a depth in the third direction that is greater than that of the received battery pack.

* * * * *